United States Patent [19]
Ford

[11] Patent Number: 5,155,507
[45] Date of Patent: Oct. 13, 1992

[54] MOUNTING FOR RESILIENT GLASSES TEMPLES

[76] Inventor: John C. Ford, 24929 Country Canyon Rd., Tehachapi, Calif. 93561

[21] Appl. No.: 791,526

[22] Filed: Nov. 14, 1991

[51] Int. Cl.$^5$ .............................................. G02C 5/14
[52] U.S. Cl. ...................................... 351/111; 351/121
[58] Field of Search .............. 351/111, 120, 121, 158; 2/450

[56] References Cited

U.S. PATENT DOCUMENTS

| | | |
|---|---|---|
| 2,684,014 | 7/1954 | Fairly . |
| 2,761,353 | 9/1956 | Eustis . |
| 3,189,912 | 6/1965 | Miller . |
| 4,105,305 | 8/1978 | Lazarus ............................. 351/158 |
| 4,844,606 | 7/1989 | Smith . |

*Primary Examiner*—Rodney B. Bovernick
*Attorney, Agent, or Firm*—Jacobson, Price, Holman & Stern

[57] ABSTRACT

A glasses frame is provided including a pair of opposite end temples pivotally supported therefrom for swinging movement between use positions extending rearwardly of the frame and folded positions swung inwardly into position generally paralleling and disposed rearwardly of the rear side of the frame. Rigid adjustable abutment structure is operably connected between each temple and the corresponding frame end spaced along the temple from its pivot axis of swinging movement toward the free end of the temple for positively adjustably limiting swinging movement of the temple to the use position thereof, the temples being constructed of stiff, but flexibly resilient material. The use of positive adjustable limit stops in conjunction with stiff, but flexibly resilient and bendable temples enables equal side pressure to be exerted upon the opposite sides of the head of the user by the temples while still enabling the frame to be square with the face of the user.

18 Claims, 1 Drawing Sheet

MOUNTING FOR RESILIENT GLASSES TEMPLES

BACKGROUND OF THE INVENTION

1. Field of The Invention

This invention relates to an eyeglass frame equipped with resilient, bendable temples and wherein adjustable, rigid abutment structure is provided for coaction between the eyeglass frame and each of the temples to adjustably limit swinging of the forward base ends of the temples away from each other.

2. Description of Related Art

Various different forms of glasses frames with means for adjusting the tension associated temples will apply to the opposite sides of the head of a wearer heretofore have been provided. Examples of these previously known structures are disclosed in U.S. Pat. Nos. 2,684,014, 2,761,353, 3,189,912 and U.S. Pat. No. 4,844,606. However, these previously known structures do not incorporate the overall combination of structural and operational features of the instant invention whereby adjustable rigid stops are provided for each temple base end portion, which structure in conjunction with resilient temples enables substantially equal pressure to be applied to the opposite sides of the head of a wearer while still maintaining the glasses frame substantially precisely square with the front of the face of the wearer.

SUMMARY OF THE INVENTION

Various different structures heretofore have been provided for enabling the temples of glasses frame to apply a yieldable force upon the opposite sides of the head of the wearer of the glasses. Most common structure in this regard is to provide a glasses frame with temples mounted to the opposite ends of the frame in a manner such that yieldable stop structure is provided to limit swinging movement of the forward or base ends of the temples away from each other.

However, this type of construction can result in substantially equal spring pressure being applied through the glasses frame temple to the opposite sides of the head of the wearer, but with the glasses frame disposed in a position not square in relation to the front of the face of the user.

It is accordingly the main object of this invention to provide a glasses frame and temples combination incorporating structure which will enable resilient and bendable temples to be slightly shaped to conform to the users head, as is conventional, but which will also provide adjustable, positive stops to establish positive limit positions of swinging movement of the base or forward ends of the glasses temples away from each other.

Another object of this invention is to provide an adjustable positive temples stop structure for limiting swinging movement of glasses frame temples away from each other and operable to enable a user to readily make equal adjustments to each temple to temporarily increase the gripping action of the temples on his or her head.

Yet another important object of this invention is to provide positive limit stops for glasses frame temples which may be incorporated into the manufacture of conventional as well as designer-type glasses frames.

A further object of this invention is to provide a glasses frame and temples combination in accordance with the preceding objects with the adjustment and mounting features of the adjustable stops structures being such as to be readily incorporated into the design of designer glasses frames.

A final object of this invention to be specifically enumerated herein is to provide a glasses frame and temples combination in accordance with the preceding object and which will conform to conventional forms of manufacture, be of simple construction and easy to adjust so as to provide a device that will be economically feasible, long-lasting and relatively trouble free in use.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
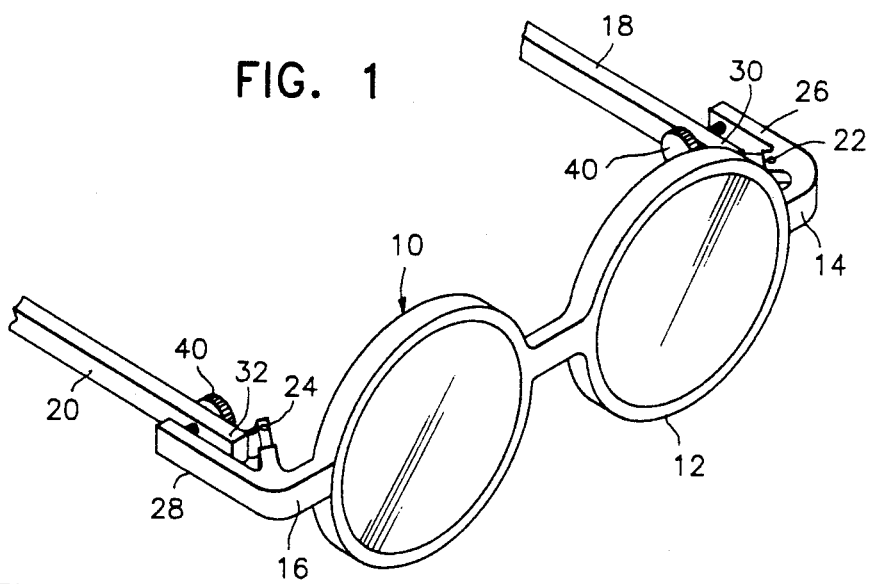
FIG. 1 is a fragmentary perspective view of a typical glasses frame and temples combination with a first form of adjustable abutment structure for the temples of the glasses frame incorporated therein.

Referring now more specifically to the drawings the numeral 10 generally designates an eyeglasses frame and temples combination referred t in general by the reference numeral 10. The combination 10 includes a frame 12 having opposite outer ends 14 and 16 and a pair of stiff, but bendable and flexive temples 18 and 20 pivotally supported from the frame ends 14 and 16 as at 22 and 24.

The outer ends 14 and 16 include elongated, wrap around and rearwardly projecting extensions 26 and 28 which lengthwise rearwardly overlap the forward base ends 30 and 32 of the temples 18 and 20.

The rear ends of the extensions 26 and 28 include inwardly facing areas 34 opposing outwardly facing areas 36 of the temples 18 and 20 and the temples 18 and 20 each have a transverse threaded bore 38 formed therethrough opening outwardly through the area 36 toward the area 34 and a headed abutment screw 40 has its threaded shank 42 threaded through each bore 38 with the head 44 of each screw 40 disposed to the inner side of the corresponding temple and the free end of the threaded shank 42 opposing the area 34 of the corresponding extension for abutting engagement therewith.

Of course, the temples 18 and 20 are bendable (to be shaped as deemed as necessary in the conventional manner) but are also flexibly resilient. In addition, the abutment screws 40 may be adjusted as desired so that the rear end portions of the temples 18 and 20 apply the desired amount of clamping forces on opposite sides of wearer. In addition, even though the temples 18 and 20 may be misshaped during a previous bending operation, the range of adjustment of the abutment screws 40 is sufficient to allow substantially equal inward pressure to be applied by each temple 18 and 20 to the corresponding side of the head of the wearer with the abutment screws 40 adjusted in a manner such that the frame 12 will remain square to the front of the face wearer. This type of adjustment cannot be carried by temples which are spring mounted or otherwise incorporate yieldable abutments.

Figure 3:
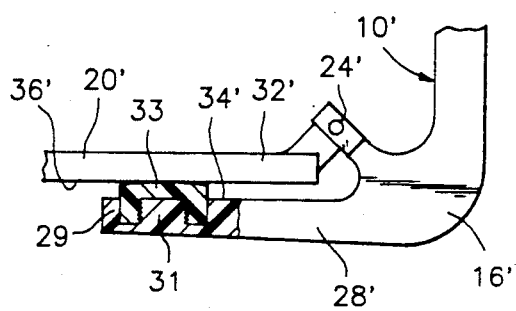
FIG. 3 is a fragmentary enlarged top plan view similar to FIG. 2 but illustrating a first modified form adjustable abutments and with the adjustable abutment and supporting portions of the glasses frame illustrated in horizontal section.

With attention now invited more specifically to FIG. 3, there may be seen a first modified form of combination referred in general by the reference numeral 10' wherein the various parts of the combination 10' are designated by prime reference numerals corresponding to the reference applied to similar components of the combination 10.

Figure 2:
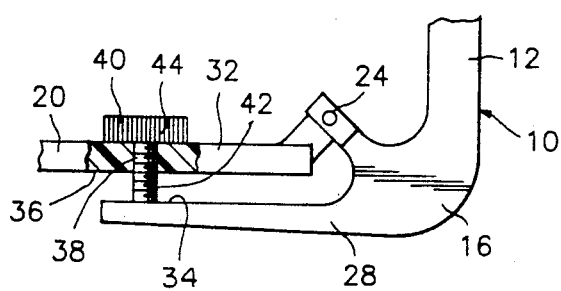
FIG. 2 is an enlarged fragmentary top plan view of the forward right hand portion of the combination illustrated in FIG. with portions of the associated temple piece being broken away and illustrated in horizontal section.

The main difference between the combination 10' and the combination 10 is that the extension 28' includes a cylindrical cavity or recess 29 formed therein opening outward of the area 34' toward the area 36' and an integral threaded shank 31 disposed in the cavity 29 coaxial therewith. In addition, in lieu of an abutment screw, corresponding to the abutment screw 40, a threaded abutment button 33 is provided and snugly received within the cavity or recess 29 and threadedly engaged with the stud 31, the exterior of the button 33 being cylindrical. Of course, in order to adjust that form of the invention illustrated in FIGS. 1 and 2, the abutment screws 40 are adjusted as desired. However, in order to adjust that form of the invention illustrated in FIG. 3, the buttons 33 are threadedly adjusted on the threaded shanks 31 to establish the desired positive limits of movement of the base ends 32' of the temples 20 away from each other.

Figure 4:
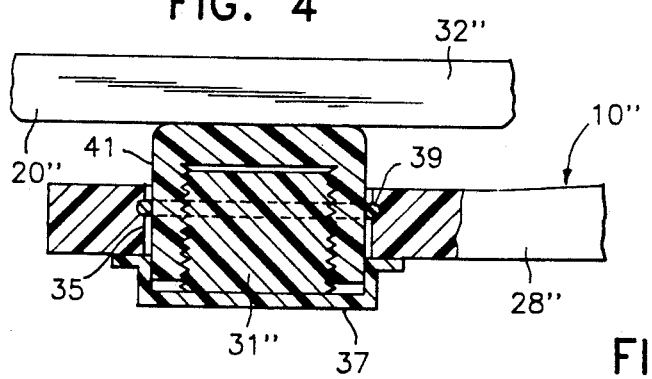
FIG. 4 is a further enlarged fragmentary top plan view illustrating structure corresponding to the left hand portions of FIGS. 2 and 3, but illustrating a second modified form of the invention.

With attention now invited more specifically to FIG. 4, there may be seen a second modified form of combination referred to in general by the reference numeral 10''. The combination 10'' is substantially the same as the combination 10', except that instead of the recess 29, the extension 28'' includes a bore 35 extending completely therethrough and a mounting bracket 37 (which may be of a decorative nature) is secured over the outer end of the bore 35 and supports a shank 31'' corresponding to the shank 31 therefrom. In addition, the bore 35 has an O-ring 39 mounted therein and the button 41 corresponding to the button 33 is threadedly engaged with the shank 34'' and includes an cylindrical outer periphery which frictionally engages the O-ring 39.

Figure 5:
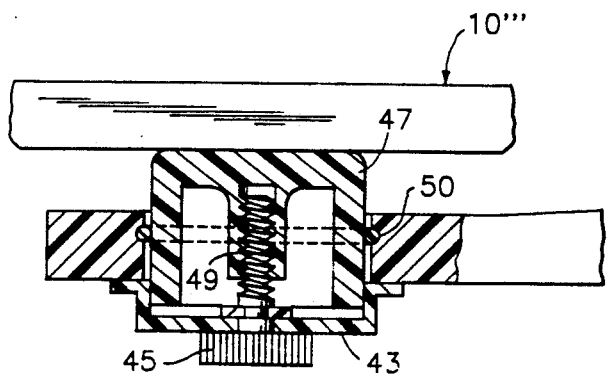
FIG. 5 is yet another top plan view similar to FIG. 4 and illustrating a third modified form of abutment.

With attention now invited more specifically to FIG. 5, a third modified form of combination referred to in general by the reference numeral 10''' is provided. The combination 10''' is substantially identical to the combination 10'', except that the bracket 43 corresponding to the bracket 37 rotatably supports the threaded shank of an adjustment screw 45 therefrom and the button 47, corresponding to the button 41, is threadedly engaged with the threaded shank 49 of the adjustment screw 45, the button 47 being frictionally engaged with an O-ring 51 corresponding to the O-ring 39. Further, the bracket 43 also may be of an ornamental nature.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination, an eyeglass frame, said frame having opposite outer ends, a pair of stiff, but flexible temples having base and free ends, pivot means connecting each temple base end to a corresponding frame outer end, said outer ends each including an elongated wrap-around extension lengthwise overlapping the outer side of the corresponding temple base end in spaced relation thereto and to an area of the corresponding temple base end spaced at least slightly from the corresponding pivot means toward said free end thereof, and adjustable rigid abutment means operatively associated with each of said temple base end areas and the opposing area of the corresponding extension operable to adjustably solidly limit movement of each of said temple base end areas toward the corresponding opposing extension area.

2. The combination of claim 1 wherein said rigid abutment means includes an abutment member threadedly supported from each of said temple base end areas and adjustable toward and away from the corresponding extension area.

3. The combination of claim 1 wherein said rigid abutment means includes an abutment member threadedly supported from each of said extension areas and adjustable toward and away from the corresponding temple base end area.

4. The combination of claim 1 wherein said rigid abutment means includes an abutment member threadedly supported from one of said temple base end and extension areas and adjustable toward and away from the other of said areas.

5. The combination of claim 2 wherein said rigid abutment means comprises a headed abutment screw threaded through each of said temple base ends with the head ends thereof disposed on the side of said of temple base ends remote from said extension areas.

6. The combination of claim 3 wherein each of said extension areas includes a threaded shank supported therefrom projecting toward the corresponding temple base end area, said abutment members each comprising an internally threaded abutment adjustably threaded on the corresponding shank and projecting outward toward the corresponding temple base end area.

7. The combination of claim 6 wherein each of said shanks is formed integrally with the corresponding extension.

8. The combination of claim 6 wherein each of said shanks is supported from a bracket carried by the corresponding extension.

9. The combination of claim 8 wherein each of said shanks is rotatably supported from the corresponding bracket and includes an enlarged head accessible for digital gripping and turning from the side of said extension remote from the corresponding temple base end.

10. The combination of claim 8 wherein each of said shanks is stationarily carried by the corresponding bracket.

11. The combination of claim 6 wherein each of said extensions defines a generally cylindrical cavity opening outwardly therefrom toward the corresponding temple base end area, said threaded shanks being disposed substantially coaxially in said cavities, said abutments being threaded on said shanks with major portions of the axial extent of said abutments disposed in said cavities.

12. The combination of claim 11 wherein said cavities include internal O-rings mounted therein intermediate the opposite ends thereof and said abutments include external cylindrical surfaces frictionally engaged with the inner peripheries of said O-rings.

13. The combination of claim 11 wherein each of said shanks is supported from a bracket carried by the corresponding extension.

14. The combination of claim 13 wherein each of said shanks is rotatably supported from the corresponding bracket and includes an enlarged head accessible for digital gripping and turning from the side of said extension remote from the corresponding temple base end.

15. The combination of claim 13 wherein each of said shanks is stationarily carried by the corresponding bracket.

16. A glasses frame for traversing the wearers face and including opposite ends for disposition at opposite sides of said wearers face and front and rear sides facing forwardly of and rearwardly toward the wearers face, an elongated, stiff, but flexibly resilient temple having opposite ends, a first of said temple ends being pivotally mounted from one of said opposite frame end for angular displacement of said temple relative to said frame about an upstanding axis between a rearwardly projecting use position and a folded position swung inwardly into position generally paralleling and disposed rearwardly of said rear side, said first frame end including a rearwardly projecting integral frame portion projecting rearwardly from said rear side an extent sufficient to extend appreciably rearward of said upstanding axis and disposed to be spaced slightly outward of said temple when the latter is in said use position, said integral frame portion and temple including coacting adjustable abutment means and rigid abutment contacting surface means operative to adjustable rigidly limit swinging movement of said temple toward said use portion.

17. The glasses frame of claim 16 wherein said adjustable abutment means is carried by said temple and said abutment contacting surface means is carried by said frame portion.

18. The glasses frame of claim 16 wherein said adjustable abutment means is carried by said frame portion and said abutment contacting surface means is carried by said temple.

* * * * *